(12) United States Patent
Ding et al.

(10) Patent No.: US 11,773,027 B1
(45) Date of Patent: Oct. 3, 2023

(54) PREPARATION METHOD AND PRODUCT OF METAL-MATRIX COMPOSITE REINFORCED BY NANOSCALE CARBON MATERIALS

(71) Applicant: Zhengzhou University of Aeronautics, Zhengzhou (CN)

(72) Inventors: Yunpeng Ding, Zhengzhou (CN); Zhiyuan Li, Pingdingshan (CN); Yizhuang Zhang, Puyang (CN); Haoju Jiang, Kaifeng (CN); Wei Zhai, Xinxiang (CN)

(73) Assignee: ZHENGZHOU UNIVERSITY OF AERONAUTICS, Zhengzhou (CN)

( * ) Notice: Subject to any disclaimer, the term of this patent is extended or adjusted under 35 U.S.C. 154(b) by 0 days.

(21) Appl. No.: 18/121,072

(22) Filed: Mar. 14, 2023

(30) Foreign Application Priority Data

Mar. 16, 2022 (CN) .......................... 202210258423.8

(51) Int. Cl.
*C04B 35/52* (2006.01)
*C04B 35/628* (2006.01)
(Continued)

(52) U.S. Cl.
CPC .......... *C04B 35/52* (2013.01); *C04B 35/6261* (2013.01); *C04B 35/62842* (2013.01); *C04B 35/62884* (2013.01); *C04B 35/65* (2013.01); *C04B 35/74* (2013.01); *C04B 41/0072* (2013.01); *C04B 2235/40* (2013.01);
(Continued)

(58) Field of Classification Search
None
See application file for complete search history.

(56) References Cited

FOREIGN PATENT DOCUMENTS

| CN | 108441662 A | * | 8/2018 | ............... C22C 1/05 |
| CN | 108441662 A | | 8/2018 | |

(Continued)

OTHER PUBLICATIONS

CNIPA, Notification of a First Office Action for CN202210258423. 8, dated Aug. 15, 2022.
(Continued)

*Primary Examiner* — Pegah Parvini
*Assistant Examiner* — Ross J Christie
(74) *Attorney, Agent, or Firm* — Zhigang Ma

(57) ABSTRACT

A preparation method and a product of a metal-matrix composite reinforced by nanoscale carbon materials are provided, including: plating metal layers on surfaces of the nanoscale carbon materials, and then adding mental particles to perform ball milling for dispersion and sintering. Volumes of the nanoscale carbon materials account for 0.01% to 30% of the metal-matrix composite. Size requirements of the nanoscale carbon materials and the metal particles are that: K×a sum of maximum cross-sectional areas of the nanoscale carbon materials in a unit volume≤a sum of surface areas of the mental particles in the unit volume; and the K represent a space compensation coefficient. The method is practical and effective, and the nanoscale carbon materials are efficiently and uniformly dispersed in metallic matrix. The obtained composite further has excellent mechanical, electrical and thermal properties, and is applied in metal-matrix composites, nano-electronic components, and biosensors.

3 Claims, 5 Drawing Sheets

(51) Int. Cl.
*C04B 35/74* (2006.01)
*C04B 35/626* (2006.01)
*C04B 41/00* (2006.01)
*C04B 35/65* (2006.01)

(52) U.S. Cl.
CPC .............................. *C04B 2235/422* (2013.01); *C04B 2235/5454* (2013.01); *C04B 2235/6567* (2013.01)

(56) References Cited

FOREIGN PATENT DOCUMENTS

| | | |
|---|---|---|
| CN | 109338134 A | 2/2019 |
| CN | 110560698 A | 12/2019 |
| CN | 111155039 A | 5/2020 |

OTHER PUBLICATIONS

Zhengzhou University of Aeronautics (Applicant), Reply to Notification of a First Office Action for CN202210258423.8, w/ replacement claims, Aug. 26, 2022.
Zhengzhou University of Aeronautics (Applicant), Supplemental Reply to Notification of a First Office Action for CN202210258423.8, w/ (allowed)replacement claims, dated Oct. 8, 2022.
CNIPA, Notification to grant patent right for invention in CN202210258423.8, dated Oct. 28, 2022.

\* cited by examiner

PREPARATION METHOD AND PRODUCT OF METAL-MATRIX COMPOSITE REINFORCED BY NANOSCALE CARBON MATERIALS

TECHNICAL FIELD

The disclosure relates to the technical field of nanoscale carbon materials, and particularly to a preparation method of a metal-matrix composite reinforced by nanoscale carbon materials and a product of the metal-matrix composite reinforced by the nanoscale carbon materials.

BACKGROUND

Metal-matrix composites reinforced by nanoscale carbon materials (i.e. carbon nanotubes, graphene, and fullerene (also referred to as C60)) have excellent properties such as high strength, high thermal conductivity, high electrical conductivity, wear resistance, and low thermal expansion. Therefore, they are essential key common materials for the rapid development of modern industry and are significantly promising in the market.

However, the nanoscale carbon materials have large surface energy and are easy to agglomerate due to Van Der Waals force inside, thereby causing a failure in fully realizing their performance advantages. In addition, the nanoscale carbon materials even become weak phases due to the agglomeration, thereby hindering the improvement of properties of the composite. Therefore, a uniform dispersion of the nanoscale carbon materials in a metallic matrix is the key to develop the metal-matrix composite.

Traditional methods for the dispersion include: adding surfactant, liquid dispersion, long-term ball milling, in-situ synthesis, etc. However, the added surfactant is difficult to be fully removed in the subsequent preparation process; after the liquid dispersion, a secondary agglomeration is easy to occur; the long-term ball milling causes damage to a structure of the carbon material; and the in-situ synthesis is greatly low in preparation efficiency. The above described factors hinder applying the traditional methods in the market.

SUMMARY

Technical problem to be solved by the disclosure is to provide a preparation method and a product of a metal-matrix composite reinforced by nanoscale carbon materials, thereby to overcome the deficiencies in the art. Therefore, the nanoscale carbon materials are improved to be applied in the metal-matrix composite and other fields. The preparation method of the disclosure can effectively and uniformly disperse the nanoscale carbon materials in metallic matrix to obtain the metal-matrix composite, and the obtained metal-matrix composite also has excellent mechanical, electrical and thermal properties.

In order to achieve the above object, the disclosure provides a technical solution as follows.

An object of the disclosure is to provide the preparation method of the metal-matrix composite reinforced by the nanoscale carbon materials, including the following steps: plating metal layers on surfaces of the nanoscale carbon materials to obtain plated nanoscale carbon materials; and then adding mental particles to the plated nanoscale carbon materials to perform ball milling for dispersion and sintering treatment, thereby obtaining the metal-matrix composite.

A sum of volumes of the nanoscale carbon materials accounts for a range of 0.01% to 30% of the metal-matrix composite.

Size requirements of the nanoscale carbon materials and the metal particles are that: K*a sum of maximum cross-sectional areas of the nanoscale carbon materials in a unit volume is less than or equal to a sum of surface areas of the mental particles in the unit volume; the K represents a space compensation coefficient, and is one selected from 1 to 9.

The sum of maximum cross-sectional areas of the nanoscale carbon materials in the unit volume is equal to a ratio of volume fractions of the nanoscale carbon materials to an average volume of a single nanoscale carbon material*an average of a maximum cross-sectional area of the single nanoscale carbon material.

The sum of surface areas of the metal particles in the unit volume is equal to a ratio of (1−the volume fractions of the nanoscale carbon materials) to an average volume of a single metal particle*an average surface area of the single metal particle.

In an illustrated embodiment of the disclosure, the nanoscale carbon materials include at least one kind selected from a group consisting of a carbon nanotube, graphene/graphene nanosheet, and fullerene ($C_{60}$); the metal layers in the plating include one kind selected from a group consisting of nickel, copper, zinc, tungsten, silver, titanium, cobalt, and iron; and the metal particles include one kind selected from a group consisting of copper, aluminum, magnesium, titanium, silver, nickel, iron, and cobalt.

In an illustrated embodiment of the disclosure, a maximum cross-sectional area of the carbon nanotube is an area of a longitudinal section passing through an axis; a maximum cross-sectional area of the graphene/graphene nanosheet is a single-sided area of an outer surface of a graphite layer of the graphene/graphene nanosheet; and volumes of the metal particles and the $C_{60}$ are calculated by a formula as follows:

$$V = \frac{4}{3}\pi r^3,$$

and their surface areas are calculated by a formula as follows: $S=4\pi r^2$.

When the carbon nanotube (CNT) is used, Table 1 illustrates a maximum particle size of spherical particles (including the metal particles and the $C_{60}$).

TABLE 1

| Bulk volume/ μm * μm * μm | CNT volume fraction/ % | CNT outer diameter/ nm | Sum of maximum cross-sectional areas of CNT/ nm * nm | Space compensation coefficient K | Maximum particle size of spherical particles in uniform dispersion/μm |
|---|---|---|---|---|---|
| 1 | 0.5 | 50 | 127324.0 | 1 | 46.8883 |
| 1 | 0.5 | 50 | 127324.0 | 4 | 11.7221 |
| 1 | 0.5 | 50 | 127324.0 | 9 | 5.2098 |
| 1 | 0.5 | 20 | 318309.9 | 1 | 18.7553 |
| 1 | 0.5 | 20 | 318309.9 | 4 | 4.6888 |
| 1 | 0.5 | 20 | 318309.9 | 9 | 2.0839 |
| 1 | 1 | 50 | 254647.9 | 1 | 23.3263 |
| 1 | 1 | 50 | 254647.9 | 4 | 5.8316 |
| 1 | 1 | 50 | 254647.9 | 9 | 2.5918 |
| 1 | 1 | 20 | 636619.8 | 1 | 9.3305 |
| 1 | 1 | 20 | 636619.8 | 4 | 2.3326 |
| 1 | 1 | 20 | 636619.8 | 9 | 1.0367 |

TABLE 1-continued

| Bulk volume/ μm * μm * μm | CNT volume fraction/ % | CNT outer diameter/ nm | Sum of maximum cross-sectional areas of CNT/ nm * nm | Space compensation coefficient K | Maximum particle size of spherical particles in uniform dispersion/μm |
|---|---|---|---|---|---|
| 1 | 1.25 | 50 | 318309.9 | 1 | 18.6139 |
| 1 | 1.25 | 50 | 318309.9 | 4 | 4.6535 |
| 1 | 1.25 | 50 | 318309.9 | 9 | 2.0682 |
| 1 | 1.25 | 20 | 795774.7 | 1 | 7.4456 |
| 1 | 1.25 | 20 | 795774.7 | 4 | 1.8614 |
| 1 | 1.25 | 20 | 795774.7 | 9 | 0.8273 |
| 1 | 5 | 50 | 1273239.6 | 1 | 4.4768 |
| 1 | 5 | 50 | 1273239.6 | 4 | 1.1192 |
| 1 | 5 | 50 | 1273239.6 | 9 | 0.4974 |
| 1 | 5 | 20 | 3183098.9 | 1 | 1.7907 |
| 1 | 5 | 20 | 3183098.9 | 4 | 0.4477 |
| 1 | 5 | 20 | 3183098.9 | 9 | 0.1990 |
| 1 | 10 | 50 | 2546479.1 | 1 | 2.1206 |
| 1 | 10 | 50 | 2546479.1 | 4 | 0.5301 |
| 1 | 10 | 50 | 2546479.1 | 9 | 0.2356 |
| 1 | 10 | 20 | 6366197.8 | 1 | 0.8482 |
| 1 | 10 | 20 | 6366197.8 | 4 | 0.2121 |
| 1 | 10 | 20 | 6366197.8 | 9 | 0.0942 |
| 1 | 20 | 50 | 5092958.3 | 1 | 0.9425 |
| 1 | 20 | 50 | 5092958.3 | 4 | 0.2356 |
| 1 | 20 | 50 | 5092958.3 | 9 | 0.1047 |
| 1 | 20 | 20 | 12732395.7 | 1 | 0.3770 |
| 1 | 20 | 20 | 12732395.7 | 4 | 0.0942 |

When the graphene/graphene nanosheet is used, Table 2 illustrates a maximum particle size of spherical particles (including the metal particles and the $C_{60}$).

TABLE 2

| Bulk volume/ μm * μm * μm | Graphene/ Graphene nanosheets volume fraction/ % | Graphene/ Graphene nanosheets thickness/ nm | Sum of maximum cross-sectional areas of Graphene/ Graphene nanosheets nm * nm | Space compensation coefficient K | Maximum particle size of spherical particles in uniform dispersion/μm |
|---|---|---|---|---|---|
| 1 | 0.5 | 0.335 | 14925373.1 | 1 | 0.4000 |
| 1 | 0.5 | 0.335 | 14925373.1 | 4 | 0.1000 |
| 1 | 0.5 | 0.335 | 14925373.1 | 9 | 0.0444 |
| 1 | 0.5 | 3.35 | 1492537.3 | 1 | 3.9999 |
| 1 | 0.5 | 3.35 | 1492537.3 | 4 | 1.0000 |
| 1 | 0.5 | 3.35 | 1492537.3 | 9 | 0.4444 |
| 1 | 1 | 0.335 | 29850746.3 | 1 | 0.1990 |
| 1 | 1 | 0.335 | 29850746.3 | 4 | 0.0497 |
| 1 | 1 | 0.335 | 29850746.3 | 9 | 0.0221 |
| 1 | 1 | 3.35 | 2985074.6 | 1 | 1.9899 |
| 1 | 1 | 3.35 | 2985074.6 | 4 | 0.4975 |
| 1 | 1 | 3.35 | 2985074.6 | 9 | 0.2211 |
| 1 | 5 | 0.335 | 149253731.3 | 1 | 0.0382 |
| 1 | 5 | 0.335 | 149253731.3 | 4 | 0.0095 |
| 1 | 5 | 0.335 | 149253731.3 | 9 | 0.0042 |
| 1 | 5 | 3.35 | 14925373.1 | 1 | 0.3819 |
| 1 | 5 | 3.35 | 14925373.1 | 4 | 0.0955 |
| 1 | 5 | 3.35 | 14925373.1 | 9 | 0.0424 |
| 1 | 10 | 0.335 | 298507462.7 | 1 | 0.0181 |
| 1 | 10 | 0.335 | 298507462.7 | 4 | 0.0045 |
| 1 | 10 | 0.335 | 298507462.7 | 9 | 0.0020 |
| 1 | 10 | 3.35 | 29850746.3 | 1 | 0.1809 |
| 1 | 10 | 3.35 | 29850746.3 | 4 | 0.0452 |
| 1 | 10 | 3.35 | 29850746.3 | 9 | 0.0201 |
| 1 | 20 | 0.335 | 597014925.4 | 1 | 0.0080 |
| 1 | 20 | 0.335 | 597014925.4 | 4 | 0.0020 |
| 1 | 20 | 0.335 | 597014925.4 | 9 | 0.0009 |
| 1 | 20 | 3.35 | 59701492.5 | 1 | 0.0804 |
| 1 | 20 | 3.35 | 59701492.5 | 4 | 0.0201 |
| 1 | 20 | 3.35 | 59701492.5 | 1 | 0.0804 |
| 1 | 30 | 0.335 | 895522388.1 | 4 | 0.0012 |
| 1 | 30 | 0.335 | 895522388.1 | 9 | 0.0005 |
| 1 | 30 | 0.335 | 895522388.1 | 9 | 0.0005 |
| 1 | 30 | 3.35 | 89552238.8 | 1 | 0.0469 |
| 1 | 30 | 3.35 | 89552238.8 | 4 | 0.0117 |

In an illustrated embodiment of the disclosure, the plating is one selected from a group consisting of chemical plating, electroplating, physical vapor deposition and chemical vapor deposition to make the mental layers attached to the surfaces of the nanoscale carbon materials.

In an illustrated embodiment of the disclosure, the ball milling is carried out in a two-dimensional ball mill or in a three-dimensional mixer by using both any one of dry mixing method and wet mixing method; and a rotation speed of the ball milling is at a range of 200 revolutions per minute (r/min) to 900 r/min, and a time of the ball milling is at a range of 0.1 hour (h) to 6 h.

In an illustrated embodiment of the disclosure, the sintering treatment is one selected from a group consisting of hot-pressing sintering, pre-compression plus pressureless sintering, spark plasma sintering, oscillation sintering, and microwave sintering.

In an illustrated embodiment of the disclosure, requirements for a temperature of the sintering treatment and a time of the sintering treatment are as follows.

When the metal particles are copper or copper alloy, the temperature of the sintering treatment is at a range of 550 Celsius degree (° C.) to 1000° C., and the time of the sintering treatment is at a range of 0.5 h to 3 h.

When the metal particles are aluminum or aluminum alloy, the temperature of the sintering treatment is at a range of 500° C. to 650° C., and the time of the sintering treatment is at a range of 0.5 h to 1.5 h.

When the metal particles are magnesium or magnesium alloy, the temperature of the sintering treatment is at a range of 500° C. to 550° C., and the time of the sintering treatment is at a range of 0.25 h to 1 h.

When the metal particles are titanium or titanium alloy, the temperature of the sintering treatment is at a range of 950° C. to 1200° C., and the time of the sintering treatment is at a range of 1 h to 3 h.

When the metal particles are silver or silver alloy, the temperature of the sintering treatment is at a range of 750° C. to 1000° C., and the time of the sintering treatment is at a range of 0.5 h to 3 h.

When the metal particles are nickel or nickel alloy, the temperature of the sintering treatment is at a range of 900° C. to 1200° C., and the time of the sintering treatment is at a range of 0.5 h to 3 h.

When the metal particles are iron or iron alloy, the temperature of the sintering treatment is at a range of 1000° C. to 1200° C., and the time of the sintering treatment is at a range of 0.5 h to 3 h.

When the metal particles are cobalt or cobalt alloy, the temperature of the sintering treatment is at a range of 950° C. to 1200° C., and the time of the sintering treatment is at a range of 0.5 h to 3 h.

Another object of the disclosure is to provide the product of the metal-matrix composite reinforced by the nanoscale carbon materials, which is prepared by the above described preparation method.

The disclosure provides technical effects as follows.

The dispersion of the nanoscale carbon materials in the metallic matrix is mainly achieved by dispersing the nanoscale carbon materials on surfaces of the metal particles. Long-term ball milling can change shapes of the metal particles, thus increasing the surface areas of the metal particles. But a structure of the nanoscale carbon material is easy to be damaged during the long-term ball milling, so that original surface areas of the metal particles are of great importance. A specific surface area of the nanoscale carbon material is large, so that a sum of maximum cross-sectional areas of the nanoscale carbon materials is large even with small volume fractions. Namely, the sum of maximum cross-sectional areas of the nanoscale carbon materials is easy to exceed the sum of surface areas of the metal particles, thereby causing that the nanoscale carbon materials cannot uniformly disperse in metal powder. The ratio (referred to as the K value) of the sum of surface areas of the metal particles to the sum of maximum cross-sectional areas of the nanoscale carbon materials should be 1 to 9 times to provide enough space for the nanoscale carbon materials, which is also the premise of the uniform dispersion of the nanoscale carbon materials.

The preparation method of the disclosure solves the problem that the nanoscale carbon materials are easy to agglomerate without adding additives such as the surfactants, thereby avoiding the problem that the additives are difficult to be fully removed subsequently. Moreover, the preparation method of the disclosure has a short-term ball milling and does not damage the structure of the nanoscale carbon material. The preparation method of the disclosure is practical and effective, and realizes the uniform dispersion and good interface combination of the nanoscale carbon materials in the metallic matrix by reasonably adjusting the sizes of the nanoscale carbon materials and the metal particles. Therefore, the nanoscale carbon materials can be efficiently and uniformly dispersed in the metallic matrix, and the obtained metal-matrix composite reinforced by the nanoscale carbon materials also has excellent mechanical, electrical and thermal properties, so that the nanoscale carbon materials are widely used in a plurality of application fields, such as metal-matrix composites, nano-electronic components and biosensors.

BRIEF DESCRIPTION OF DRAWINGS

In order to more clearly illustrate technical solutions in embodiments of the disclosure, the attached drawings used in the embodiments are briefly described below. Apparently, the attached drawings in the following description are some embodiments of the disclosure, and other drawings may be obtained from them without creative effort to those skilled in the art.

DETAILED DESCRIPTION OF EMBODIMENTS

A variety of illustrated embodiments of the disclosure are described in detail. The detailed description should not be considered as a limitation to the disclosure, but should be understood as a more detailed description of some aspects, features and implementation modes of the disclosure.

It should be understood that the terms described in the disclosure are only used for describing the illustrated embodiments and are not used to limit the disclosure. In addition, for a numerical range in the disclosure, it should be understood that each intermediate value between upper and lower limits of the numerical range is also included. Any stated value or intermediate value within a stated range and any other stated value or every smaller range between intermediate values within the stated range is also included in the disclosure. The stated range can include or exclude independently upper and lower limits of these smaller ranges.

Unless otherwise described, all of technical and scientific terms used herein have the same meaning as those commonly understood by those skilled in the art described in the disclosure. Although the disclosure only describes the illustrated methods and materials, any methods and materials similar or equivalent to those described herein can also be used in the implementation modes or experiments of the disclosure. All of literature mentioned in the disclosure is incorporated by reference to disclose and describe methods and/or materials related to the literature. In case of conflict with any incorporated literature, the contents of the disclosure shall prevail.

Without departing from the scope or spirit of the disclosure, it is obvious to those skilled in the art that various improvements and changes can be made to the illustrated embodiments of the disclosure. Other embodiments obtained from the description of the disclosure are obvious to those skilled. The description and embodiment of the disclosure are only illustrative.

The terms "containing", "including", "possessing", "having" and so on used herein are open terms, which means including but not limited to.

Embodiment 1

Figure 4:
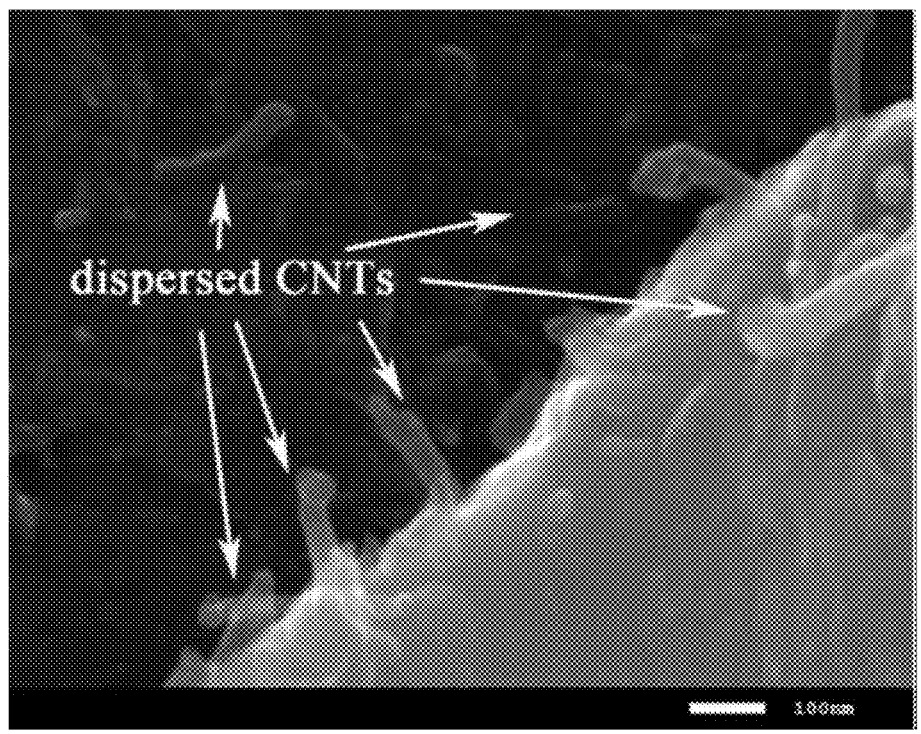
FIG. 4 illustrates a scanning photograph of a distribution of CNT after a fracture of a sintered sample of magnesium alloy AZ91 with 0.5% CNT (nickel plated) according to an embodiment 1 of the disclosure.

Surfaces of carbon nanotubes (CNTs) are plated with nickel by chemical plating, a volume fraction of the carbon nanotubes (also referred to a sum of volumes of the nanoscale carbon materials accounting for a percentage of an obtained metal-matrix composite) is 0.5%, an outer diameter of the carbon nanotube is 50 nanometers (nm), and a requirement of a particle size of magnesium alloy AZ91 (referred to an alloy containing 9% aluminium (Al) and 1% zinc (Zn)) is less than or equal to 46.9 micrometers (μm) by calculation (see Table 3 for the calculation). Then a ball milling is performed on the CNTs plated with nickel layers and the magnesium alloy AZ91 particles under argon atmosphere for dispersing the CNTs, a rotation speed of the ball milling is 400 revolutions per minute (r/min), and a time of the ball milling is 3 hours (h). The ball milling is followed by vacuum hot pressing sintering at a temperature of 550 Celsius degree (° C.) for 1 h to obtain a metal-matrix composite reinforced by nanoscale carbon materials. A scanning photo of the metal-matrix composite is shown in FIG. 4. It can be seen from FIG. 4 that the CNTs are uniformly distributed in the composite, no CNT agglomeration is found, and the dispersed CNTs are pulled out at a fracture of the composite, thereby to prove that bridging action of the CNTs improves the strength of the composite. A tensile strength of the composite is 450 megapascals (MPa), an elongation of the composite is 8%, a thermal conductivity of the composite is 28% higher than that of the metal-matrix material, and an electrical conductivity of the composite is increased by 23%.

TABLE 3

| Bulk volume/ μm * μm * μm | CNT volume fraction/ % | CNT outer diameter/ nm | Sum of maximum cross-sectional areas of CNT/ nm * nm | Space compensation coefficient K | Maximum particle size of spherical particles in uniform dispersion/μm |
|---|---|---|---|---|---|
| 1 | 0.5 | 50 | 127324.0 | 1 | 46.8883 |

Embodiment 2

Figure 5:
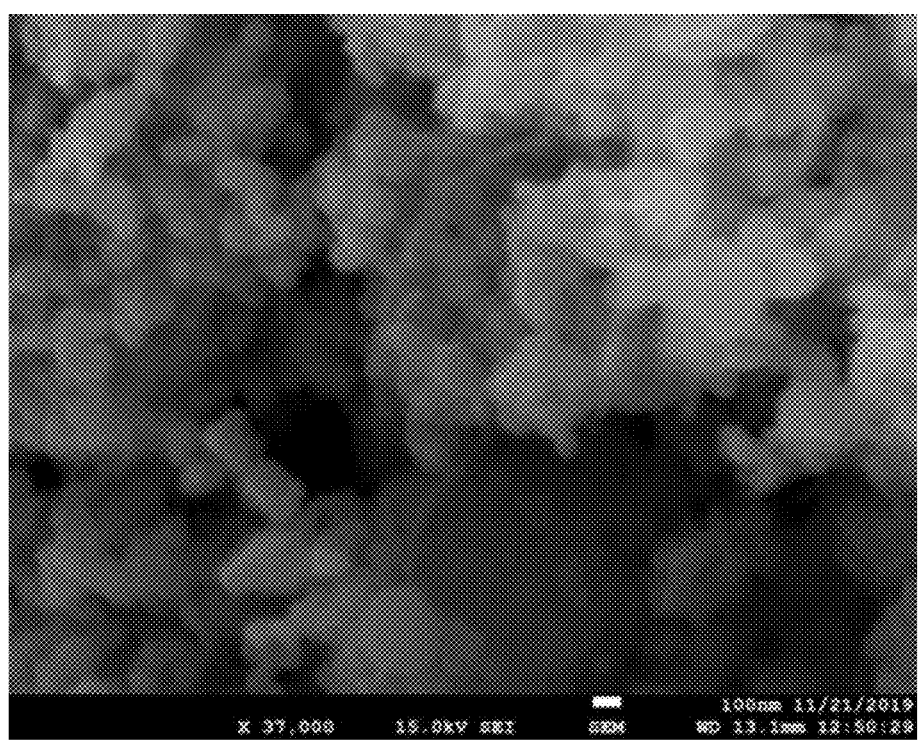
FIG. 5 illustrates a scanning photograph of a uniform dispersion of mixed powder of fine copper mental particles with 5% CNT according to an embodiment 2 of the disclosure.

Surfaces of carbon nanotubes are plated with copper by chemical plating, a volume fraction of the carbon nanotubes is 5%, an outer diameter of the carbon nanotube is 20 nm, and a requirement of a particle size of copper powder is less than or equal to 0.199 μm by calculation (see Table 4 for the calculation). Then a ball milling is performed on the CNTs plated with copper layers and the copper powder under argon atmosphere for dispersing the CNTs, a rotation speed of the ball milling is 200 r/min and a time of the ball milling is 4 h. The CNTs and the copper powder are uniformly mixed together after the ball milling, and a topography of which is shown in FIG. 5. The ball milling is followed by vacuum hot pressing sintering at a temperature of 800° C. for 1 h to obtain a metal-matrix composite reinforced by nanoscale carbon materials. A tensile strength of the composite is 380 MPa, an elongation of the composite is 8%, a thermal conductivity of the composite is 39% higher than that of the matrix material, and an electrical conductivity of the composite is increased by 32%.

Figure 7:
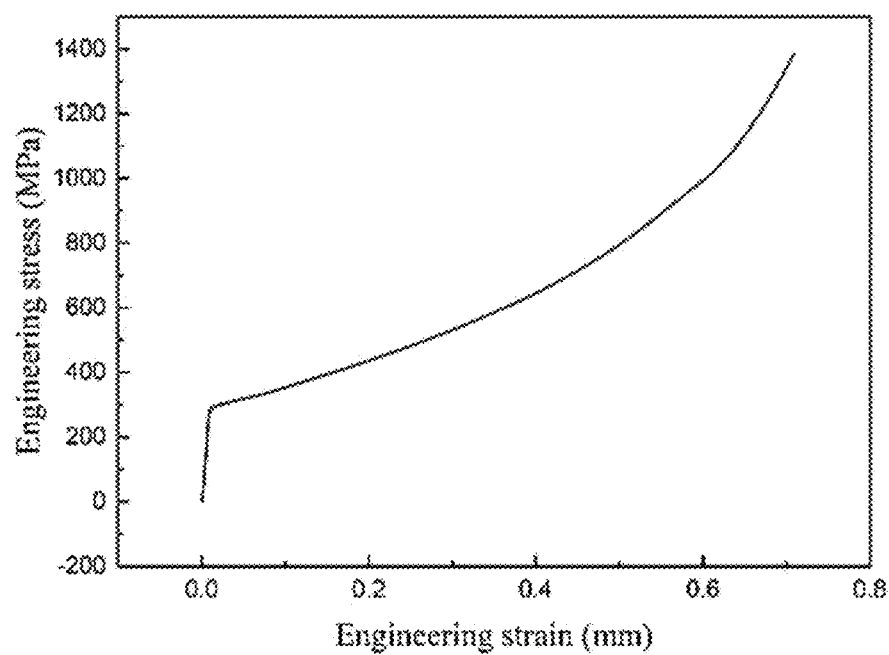
FIG. 7 illustrates a schematic diagram of a good compressive mechanical property curve of a composite of copper uniformly dispersed with CNT with 5% CNT according to the embodiment 2 of the disclosure.

FIG. 7 illustrates a schematic diagram of a good compressive mechanical property curve of a composite of copper uniformly dispersed with CNT with 5% CNT in this embodiment. The composite has high strength, good plasticity and excellent comprehensive performance.

TABLE 4

| Bulk volume/ μm * μm * μm | CNT volume fraction/ % | CNT outer diameter/ nm | Sum of maximum cross-sectional areas of CNT/ nm * nm | Space compensation coefficient K | Maximum particle size of spherical particles in uniform dispersion/μm |
|---|---|---|---|---|---|
| 1 | 5 | 20 | 3183098.9 | 9 | 0.1990 |

Contrast Embodiment 1 (Particle Size of Metal Powder is not Calculated According to the Space Capacity)

Figure 1:
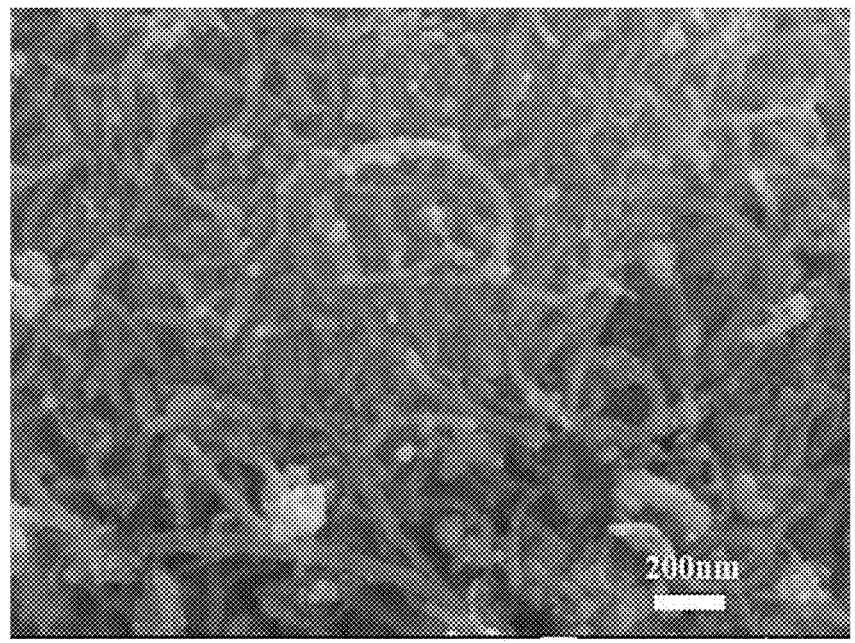
FIG. 1 illustrates a schematic diagram of scanning electron microscope (SEM) topography of carbon nanotubes with nickel plated on their surfaces.
Figure 2A:
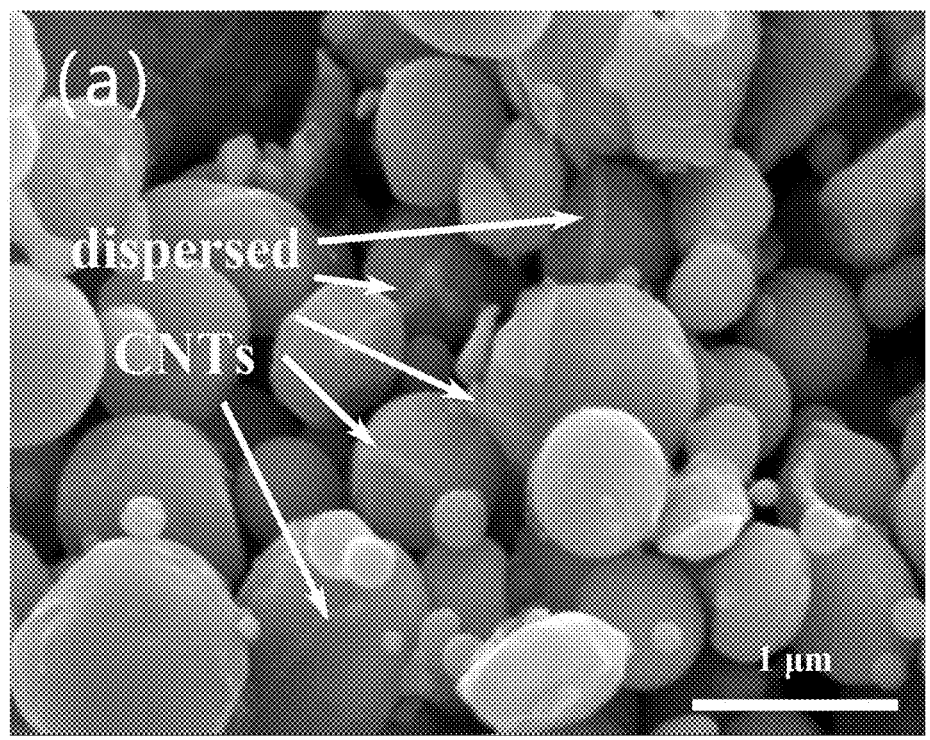
FIG. 2A illustrates a schematic diagram of dispersed carbon nanotubes (CNTs) on surfaces of copper metal particles.
Figure 2B:
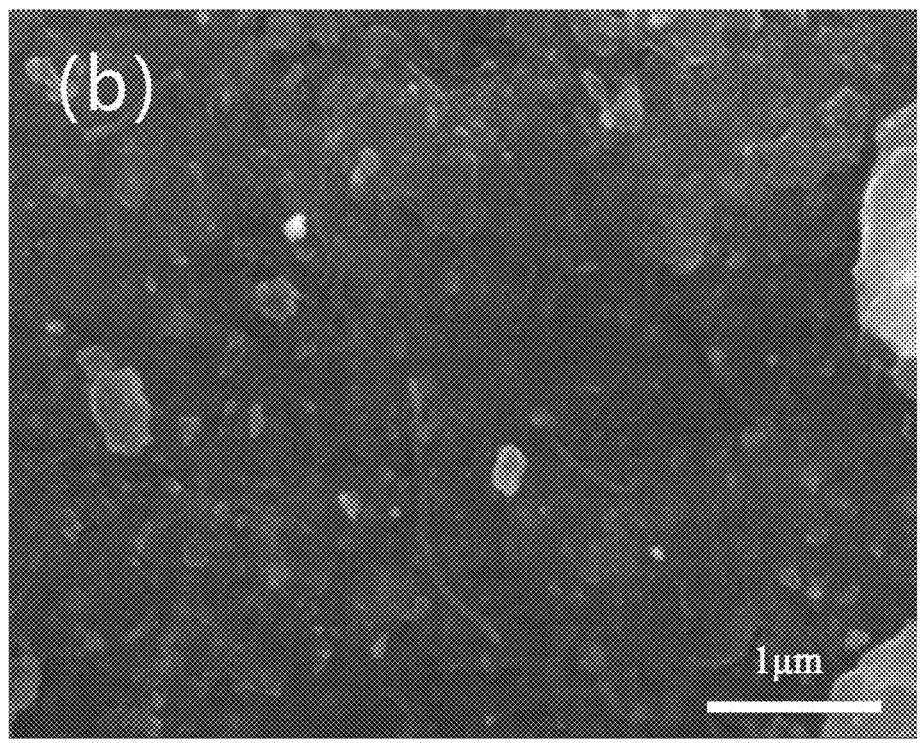
FIG. 2B illustrates a schematic diagram of dispersed CNTs on surfaces of nickel metal particles.
Figure 2C:
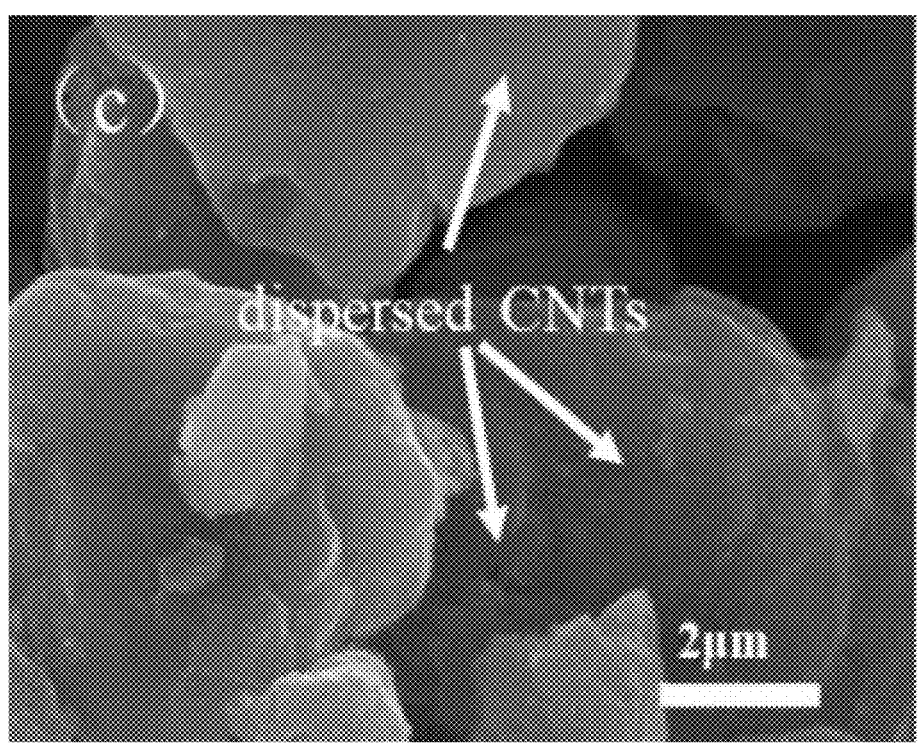
FIG. 2C illustrates a schematic diagram of dispersed CNTs on surfaces of silver metal particles.
Figure 2D:
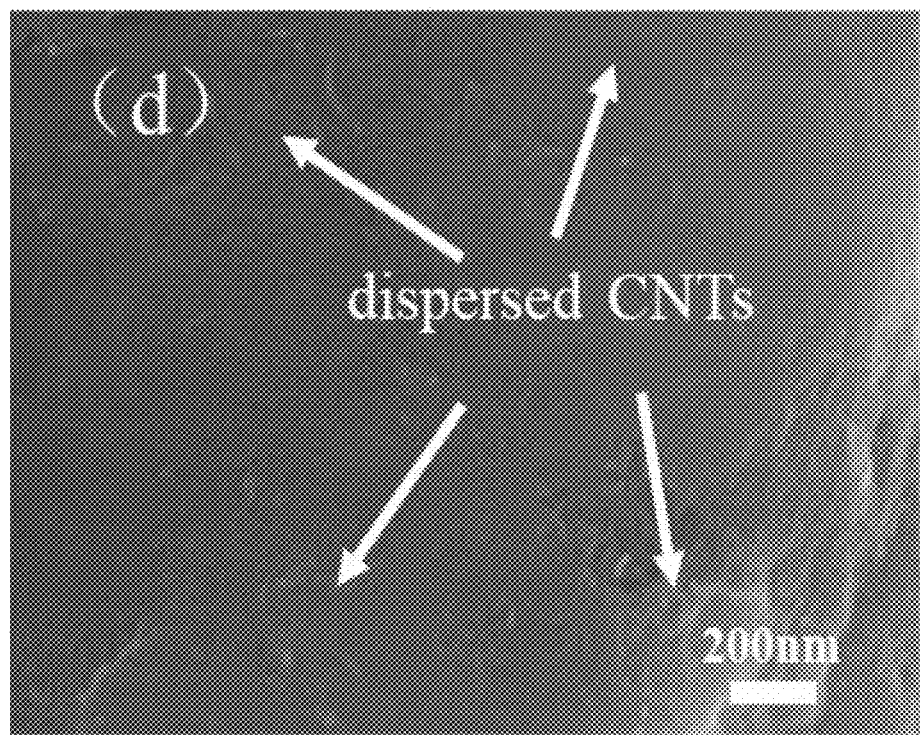
FIG. 2D illustrates a schematic diagram of dispersed CNTs on surfaces of magnesium metal particles.
Figure 3:
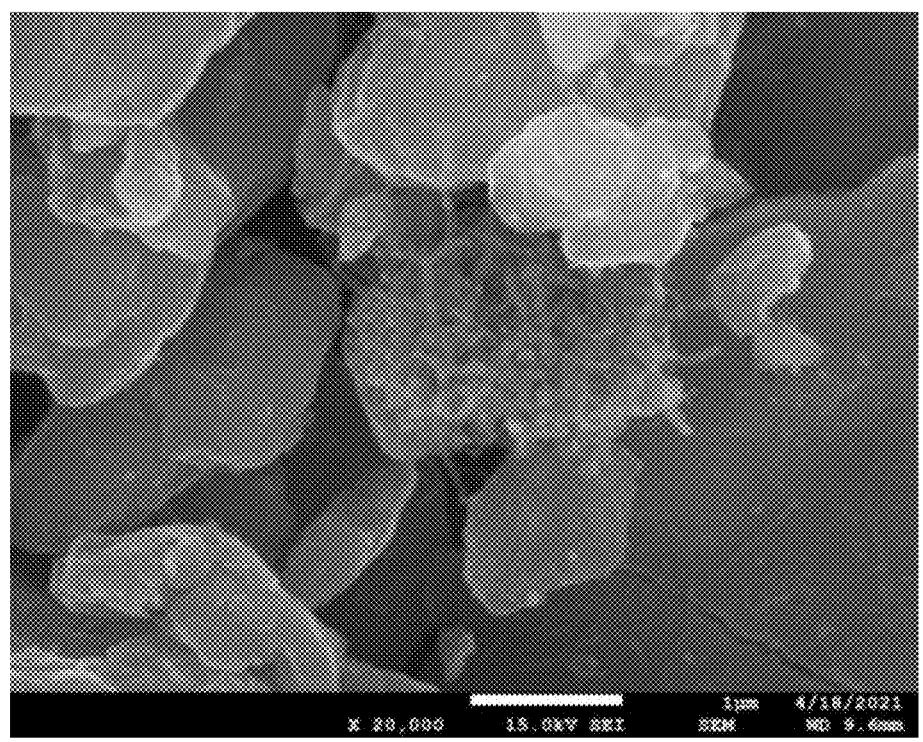
FIG. 3 illustrates a scanning photograph of CNT agglomerates in mixed powder of magnesium alloy AZ91 with 0.5% CNT (nickel plated) according to a contrast embodiment 1 of the disclosure.

Surfaces of carbon nanotubes are plated with nickel by chemical plating, a volume fraction of the carbon nanotubes is 0.5%, an outer diameter of the carbon nanotube is 50 nm, and a particle size of magnesium alloy AZ91 is required to be greater than 46.9 μm. Then a ball milling is performed on the CNTs plated with nickel layers and the magnesium alloy AZ91 particles for dispersing the CNTs under argon atmosphere, a rotation speed of the ball milling is 400 r/min and a time of the ball milling is 3 h. The ball milling is followed by vacuum hot pressing sintering at a temperature of 550° C. for 1 h to obtain a metal-matrix composite reinforced by nanoscale carbon materials. A scanning photograph of the composite is shown in FIG. 3, which significantly illustrates the CNT agglomeration. And the CNT agglomeration is just the area where the stress is easy to concentrate during the deformation of the composite, which makes the composite crack prematurely, and causes its strength and plasticity decreasing. A tensile strength of the composite is 320 MPa, an elongation of the composite is 4%, a thermal conductivity of the composite is 4% higher than that of the mental-matrix material, and an electrical conductivity of the composite is increased by 3%.

Contrast Embodiment 2 (Surfaces of Carbon Nanotubes are not Plated with Metal)

Figure 6:
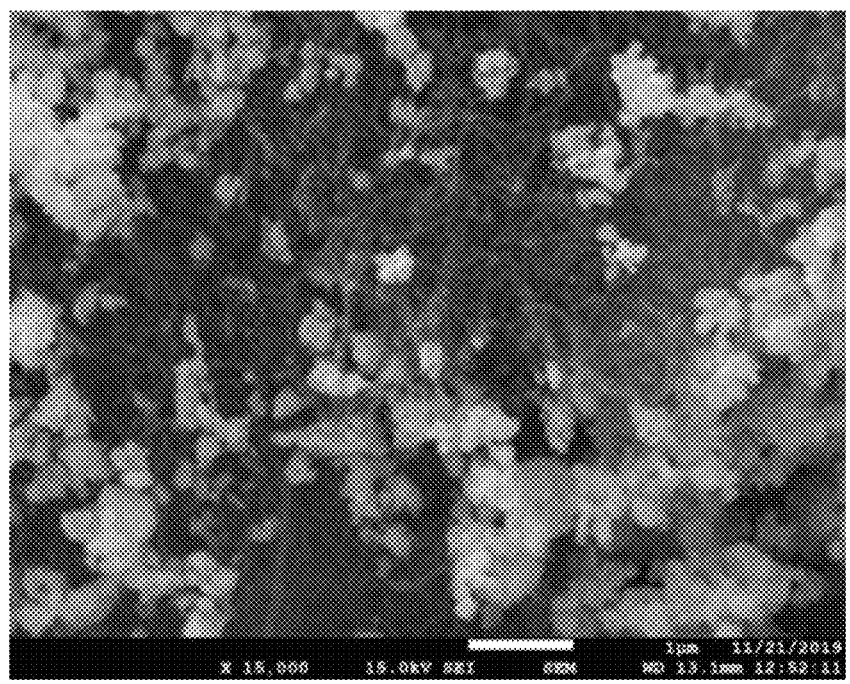
FIG. 6 illustrates a scanning photograph of CNT agglomerates in mixed powder of fine copper mental particles with 5% CNT according to a contrast embodiment 2 of the disclosure.

Surfaces of carbon nanotubes are not treated and mixed with copper powder directly to obtain a mixed powder, a volume fraction of the carbon nanotubes is 5%, an outer diameter of the carbon nanotube is 50 nm, and a particle size of the copper powder is required to be less than or equal to 0.199 μm by calculation (see Table 4 of the embodiment 2 for the calculation). Then a ball milling is performed on the mixed powder of the carbon nanotubes with the copper powder under argon atmosphere, a rotation speed of the ball milling is 200 r/min and a time of the ball milling is 4 h. The carbon nanotubes agglomerate still significantly (namely the CNT agglomeration) after the ball milling and the mixed powder of the carbon nanotubes with the copper powder is not uniformly mixed together. A tropology of the CNT agglomeration is shown in FIG. 6. The ball milling is followed by vacuum hot pressing sintering at a temperature of 800° C. for 1 h to obtain a metal-matrix composite reinforced by nanoscale carbon materials. A tensile strength of the composite is 276 MPa, an elongation of the composite is 1.8%, a thermal conductivity of the composite is 28% lower than that of the metal-matrix material, and an electrical conductivity of the composite is decreased by 25%.

The above described embodiments only describe the illustrated method of the disclosure, not limit the scope of the disclosure. Without departing from the design spirit of the disclosure, all the variations and improvements made by those skilled in the art to the technical solution of the disclosure should fall within the protection scope of the disclosure.

What is claimed is:

1. A preparation method of a metal-matrix composite reinforced by nanoscale carbon materials, comprising: plating metal layers on surfaces of the nanoscale carbon materials to obtain plated nanoscale carbon materials; and then adding metal particles to the plated nanoscale carbon materials to perform ball milling for dispersion and sintering treatment, thereby obtaining the metal-matrix composite;
   wherein a sum of volumes of the nanoscale carbon materials accounts for a range of 0.01% to 30% of the metal-matrix composite;
   wherein size requirements of the nanoscale carbon materials and the metal particles are that: K*a sum of maximum cross-sectional areas of the nanoscale carbon materials in a unit volume is less than or equal to a sum of surface areas of the metal particles in the unit volume; the K represents a space compensation coefficient, and is one selected from 1 to 9;
   wherein the sum of maximum cross-sectional areas of the nanoscale carbon materials in the unit volume is equal to a ratio of volume fractions of the nanoscale carbon materials to an average volume of a single nanoscale carbon material*an average of a maximum cross-sectional area of the single nanoscale carbon material;
   wherein the sum of surface areas of the metal particles in the unit volume is equal to a ratio of (1−the volume fractions of the nanoscale carbon materials) to an average volume of a single metal particle*an average surface area of the single metal particle;
   wherein the nanoscale carbon materials comprise at least one kind selected from a group consisting of a carbon nanotube, a composite of graphene and graphene nanosheet, and fullerene (Coo); the metal layers in the plating comprise one kind selected from a group consisting of nickel, copper, zinc, tungsten, silver, titanium, cobalt, and iron; and the metal particles comprise one kind selected from a group consisting of copper, aluminum, magnesium, titanium, silver, nickel, iron, and cobalt;
   wherein a maximum cross-sectional area of the carbon nanotube is an area of a longitudinal section passing through an axis; and a maximum cross-sectional area of the composite of graphene and graphene nanosheet is a single-sided area of an outer surface of a graphite layer of the composite of graphene and graphene nanosheet;
   wherein a rotation speed of the ball milling is at a range of 400 revolutions per minute (r/min) to 900 r/min, and a time of the ball milling is at a range of 3 hours (h) to 6 h;
   wherein requirements for a temperature of the sintering treatment and a time of the sintering treatment are as follows:
   wherein when the metal particles are copper, the temperature of the sintering treatment is at a range of 550 Celsius degree (° C.) to 1000° C., and the time of the sintering treatment is at a range of 0.5 h to 3 h;
   wherein when the metal particles are aluminum, the temperature of the sintering treatment is at a range of 500° C. to 650° C., and the time of the sintering treatment 1s at a range of 0.5 h to 1.5 h;
   wherein when the metal particles are magnesium, the temperature of the sintering treatment is at a range of 500° C. to 550° C., and the time of the sintering treatment 1s at a range of 0.25 h to 1 h;
   wherein when the metal particles are titanium, the temperature of the sintering treatment is at a range of 950° C. to 1200° C., and the time of the sintering treatment is at a range of 1 h to 3 h;
   wherein when the metal particles are silver, the temperature of the sintering treatment is at a range of 750° C. to 1000° C., and the time of the sintering treatment is at a range of 0.5 h to 3 h;
   wherein when the metal particles are nickel, the temperature of the sintering treatment is at a range of 900° C. to 1200° C., and the time of the sintering treatment is at a range of 0.5 h to 3 h;
   wherein when the metal particles are iron, the temperature of the sintering treatment is at a range of 1000° C. to 1200° C., and the time of the sintering treatment is at a range of 0.5 h to 3 h; and
   wherein when the metal particles are cobalt, the temperature of the sintering treatment is at a range of 950° C. to 1200° C., and the time of the sintering treatment is at a range of 0.5 h to 3 h.

2. The preparation method of the metal-matrix composite reinforced by the nanoscale carbon materials according to claim 1, wherein the plating is one selected from a group consisting of chemical plating, electroplating, physical vapor deposition and chemical vapor deposition.

3. The preparation method of the metal-matrix composite reinforced by the nanoscale carbon materials according to claim 1, wherein the sintering treatment is one selected from a group consisting of hot-pressing sintering, pre-compression plus pressureless sintering, spark plasma sintering, oscillation sintering, and microwave sintering.

\* \* \* \* \*